Dec. 28, 1948. R. R. KUBIC ET AL 2,457,691
MEANS FOR ASSEMBLING METAL ARTICLES
Filed Aug. 22, 1944 2 Sheets-Sheet 1
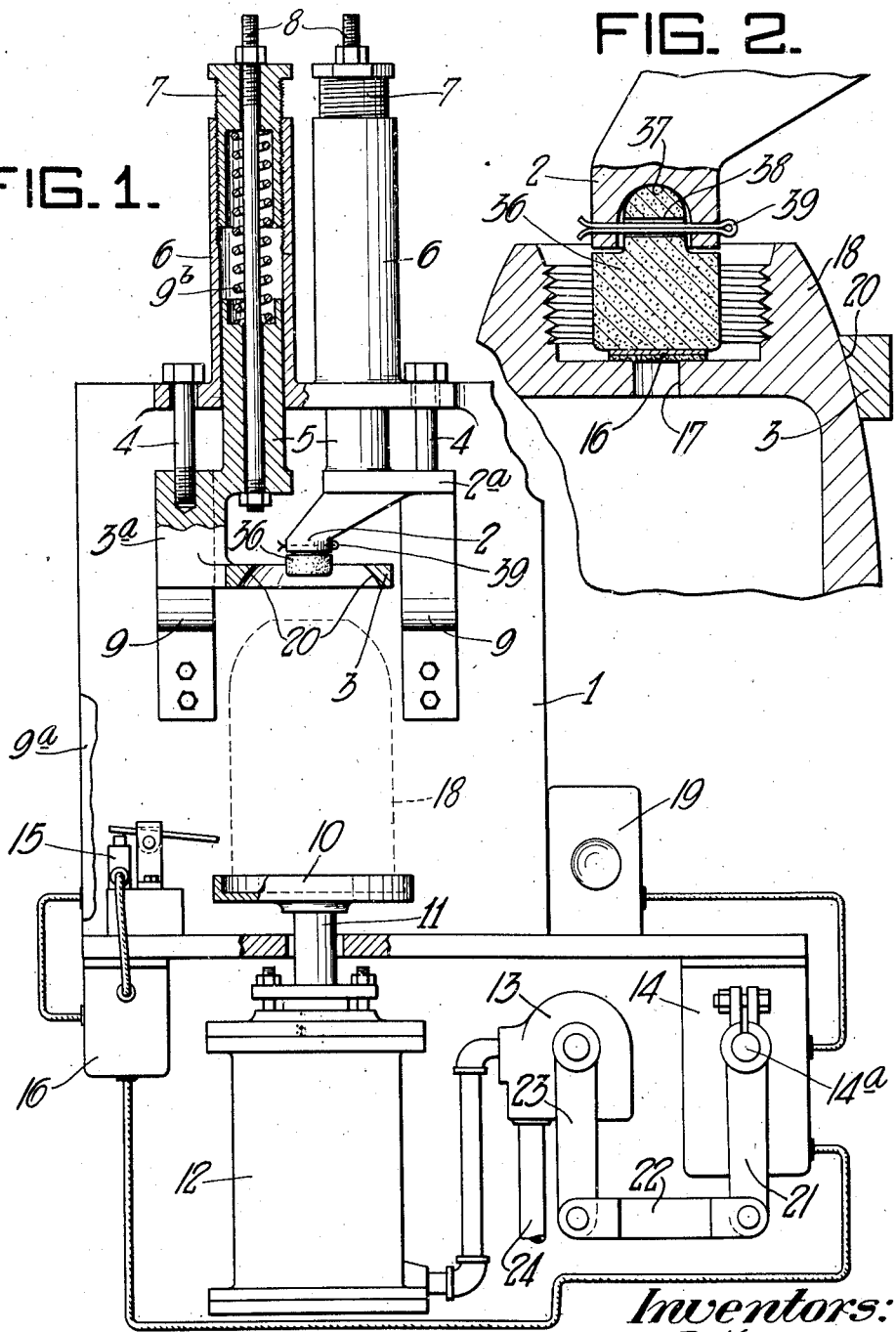

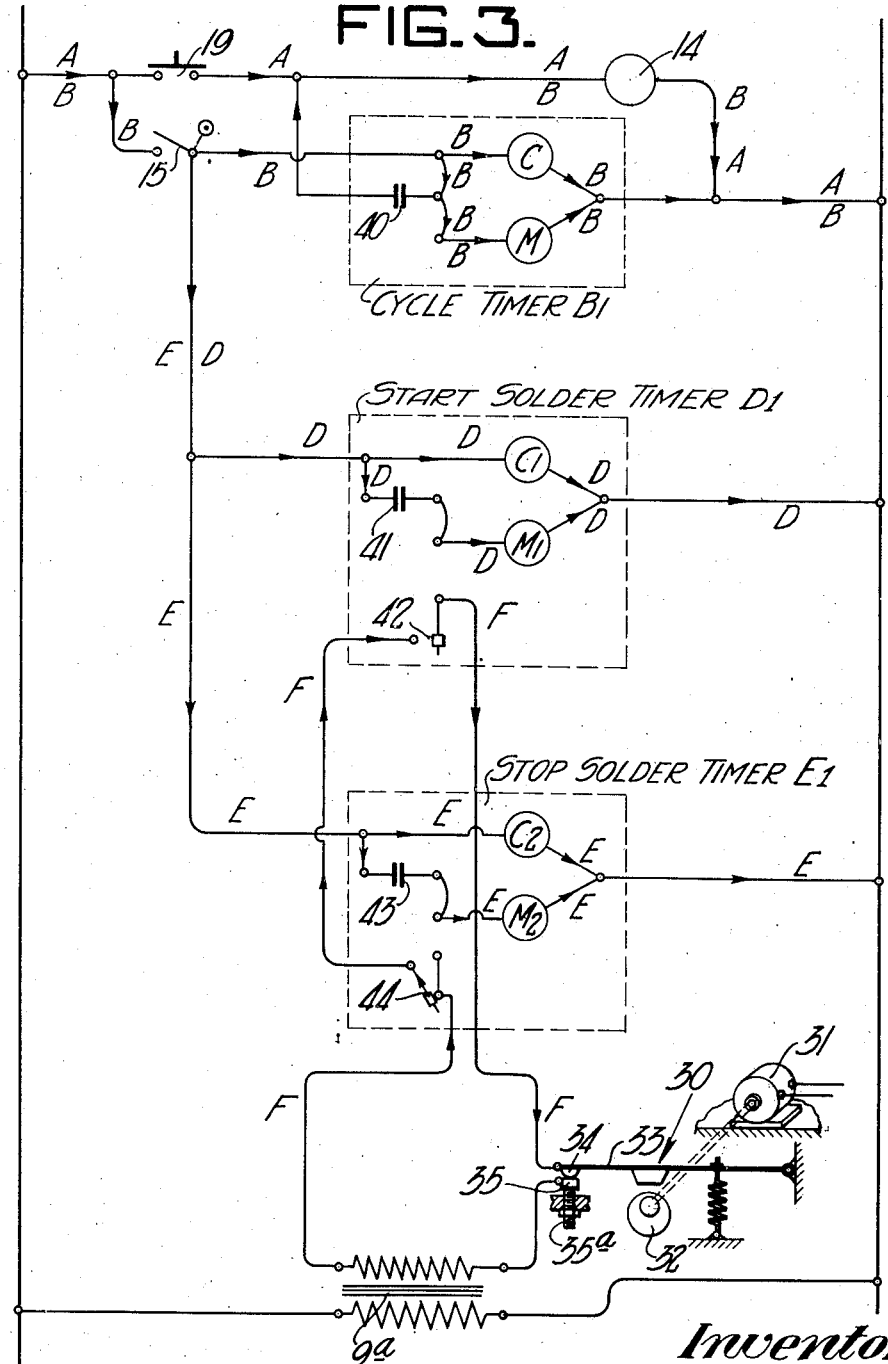

Patented Dec. 28, 1948

2,457,691

UNITED STATES PATENT OFFICE 2,457,691

MEANS FOR ASSEMBLING METAL ARTICLES

Raymond R. Kubic and Carl H. Nylander, McKeesport, Pa., assignors to National Tube Company, a corporation of New Jersey Application August 22, 1944, Serial No. 550,642

2 Claims. (Cl. 219—4)

This invention relates to assembling metal articles, and more particularly to apparatus for attaching thin metallic discs to metal articles.

It is frequently necessary to firmly attach a thin metallic disc of copper or the like over a relatively inaccessible hole in a metallic container or casing, composed of a metal such as steel, to form a pressure tight joint therebetween. Due to the inaccessibility of the location where the attachment may be desired, conventional soldering practice cannot be followed and due to the thin cross section of the disc, and particularly in cases where it is composed of a different metal than the casing, it is impossible to follow conventional welding practice.

Accordingly, it is an object of the present invention to provide apparatus for attaching a thin metallic disc to a metallic container or casing.

It is another object to provide apparatus for attaching a thin disc to a relatively inaccessible portion of the container or casing.

It is a further object of the present invention to provide apparatus for attaching a thin copper disc to a relatively inaccessible portion of a steel container or casing.

The foregoing and further objects will be apparent from the specification and drawings wherein:

Figure 1 is a side elevation, partly in section of an embodiment of our invention;

Figure 2 is an enlarged sectional view of the electrodes showing the parts to be soldered in assembled position; and Figure 3 is a diagrammatic view of suitable electrical apparatus and connections for controlling the apparatus of our invention.

Referring more particularly to the drawings, the numeral 1 indicates the frame of a preferred embodiment of our invention. The frame 1 carries a positive electrode 2, suitably profiled and positioned for entrance into our opening in a workpiece presented thereto and a negative electrode 3, suitably profiled to engage the exterior surface of the workpiece and relatively positioned axially with respect to positive male electrode 2 for simultaneous internal-external seating of the two electrodes upon the desired sections of the workpiece. The electrode 2 is of suitable size and shape to engage the entire upper surface of a disc which is to be attached to the workpiece. Downward movement of electrodes 2 and 3 is restricted by heads of studs 4, disposed on the top surface of frame 1, which studs pass through suitable holes therein and extend downwardly into screw threaded engagement with bases 2ª and 3ª of electrodes 2 and 3.

Electrodes 2 and 3 are spring biased downwardly by means of plungers 5 which pass through holes in frame 1 and enter cylinders 6 affixed to the top surface of frame 1. In threaded engagement with and at the extreme upper end of cylinders 6 are spring adjusting screws 7. Passing through neat fitting holes in screws 7, plungers 5 and electrode bases 2ª and 3ª are bolts 8 axially positioned therein by means of nuts disposed on either end. Surrounding bolts 8 and engaged at either end by plungers 5 and adjusting screws 7 are springs 9ᵇ which yieldingly resist upward movement of both electrodes. The resistance of the springs 9 may be adjusted by screws 7.

Electrodes 2 and 3 are electrically connected to a conventional electric welding transformer 9ª by means of conductors 9, one each of which connects the electrodes 2 and 3 with the proper terminal of the welding transformer. The welding transformer 9ª changes regular high voltage line current to the low voltage high ampere current ordinarily used for electric welding. The magnitude of the welding current is dependent upon the gauge and characteristics of the metals to be joined. Interposed in one of the conductors 9 connecting the transformer with the electrodes 2 and 3, is a motor driven circuit interrupter 30, which will be more fully described hereinafter.

Means for presenting a workpiece, such as a machined shell forging illustrated in the drawings, to the electrodes is provided by a lift 10 in the form of a cup in which the base of the workpiece fits. Lift 10 is mounted on the upper end of a vertical piston rod 11 of a pneumatic cylinder 12. The lift 10, piston rod 11 and cylinder 12 are axially aligned with the electrodes 2 and 3. Lift 10, in its lower position shown in Figure 1 is suitably positioned below electrodes 2 and 3 so that a workpiece may be set into the lift without interference from electrodes 2 and 3. Contact between workpiece and electrodes is effected by raising lift 10 by activation of cylinder 12 through valve 13 operated by solenoid 14 having a rotatable core 14ª to which is affixed an arm 21 connected by a link 22 to operating lever 23 of the valve 13. Solenoid 14 is actuated by a switch 19 as explained more fully hereinafter.

The motor driven circuit breaker 30 hereinabove referred to consists of a variable speed motor 31, to the armature shaft of which is keyed a cam 32. A spring biased arm 33 having a contact 34 at the end thereof is operable by the cam 32 to lift the contact 34 from its associated contact 35 and thereby interrupt an electrical current passed through the arm 33, the contacts 34 and 35 to one of the electrodes as before described. Lower contact 35 may be adjusted upwardly or downwardly by screw 35a to increase or decrease the time the contacts 34 and 35 are together.

Also carried by the frame 1 are a limit switch 15 mounted for actuation by the lift 10 on its upward stroke and a timer 16, containing timers $B^1$, $D^1$ and $E^1$, the operations of which are also more fully described hereinafter.

It will be noted that electrode 2 is equipped with an electrode insert 36 having a hemispherical upper surface 37 thereon and having an oversize lateral hole 38 therein for passage of a cotter pin 39 therethrough and through electrode 2 whereby insert 36 is flexibly carried by electrode 2. The insert 36 is made of a highly conductive material, such as carbon, and is designed for periodic replacement necessitated by wear, burning or otherwise. Aforementioned flexible attachment of insert 36 to electrode 2 provides for full surface seating of insert 36 on a disc 16 to be soldered to the shell or container 18, thus compensating for slight irregularities of levelness in workpiece and disc when presented to soldering electrode insert 36.

In operation, a light gauge copper disc 16 of about .005″ in thickness is coated over substantially one entire side or surface with a paste consisting of powdered solder, a flux and a material such as grease for maintaining a workable paste body, and placed substantially concentric with and over hole 17 of workpiece 18 with the coated side in contact with the workpiece 18 as shown in Figure 2. The workpiece 18 is then set in the cup of lift 10 and is ready for automatic soldering action of machine.

To begin operation, push button switch 19 is depressed, closing circuit A containing solenoid 14. Such activation of solenoid 14 produces rotation of solenoid core 14a transmitting rotary motion to arm 21 affixed thereto, said motion being translated to horizontal motion through connecting link 22 attached to arm 21 on one end and air valve lever 23 on the other end, whereby air valve 13 is opened for passage of air from supply line 24 through valve 13 and thence into bottom air entrance of cylinder 12. Admission of high pressure air at bottom of cylinder 12 raises piston therein with resultant rise of lift 10 and workpiece 18 contained thereon until nose of workpiece 18 enters electrode 3 and further upward movement is thereby arrested. In the event the workpiece 18 enters electrode 3 in axial misalignment, the internal bore thereof is profiled concentrically as at 20 to suit the outer surface of workpiece 18 in such manner that self alignment is effected. A section of the electrode 2 is shown in Figure 2 with workpiece 18 and disc 16 in position to be soldered.

During its upward movement lift 10 trips limit switch 15 thereby closing circuits B wherein cycle timer $B^1$ and solenoid 14 are both contained. At this point push button switch 19 may be released as activation of solenoid 14 is maintained by circuit B therethrough created by closure of limit switch 15 whereby circuit B passing through clutch C magnetically closes contacts 40 for maintenance of aforementioned branch of circuit B containing solenoid 14. In addition, circuit B activates synchronous timer motor M of timer $B^1$ from whence cycle timing is begun for maintenance of closed circuit B for any prescribed period of time at which moment timer motor M will have moved timer contacts (not shown) to a position for terminating circuit closure.

Simultaneously with closure of circuits B, limit switch 15 also closes circuits D and E to start solder timer $D^1$ and stop solder timers $E^1$, respectively. Circuit D activates clutch $C^1$ which magnetically closes contacts 41 thus supplying current to timer motor $M^1$ of timer $D^1$ set to control movable contact 42 which after prescribed period of time, i. e. time for workpiece to be presented to electrodes 2 and 3 for soldering as hereinbefore described, moves from normal open position as shown in the wiring diagram, to closed circuit position closing resistance welding control circuit F. Closure of said circuit F releases current from resistance welding transformer 9a through motor driven interruptor 30 to electrodes 2 and 3 allowing pulsating or interrupted resistance welding current to flow through workpiece from electrode 2 to electrode 3. Resistance of workpiece to such flow generates a rapid temperature rise within workpiece which is sufficient to reduce the powdered solder between the metallic disc 16 and the workpiece 18 to molten form whereby it will make a bond between the disc and the workpiece upon cooling and subsequent solidification. It is obvious that flow of pulsating or interrupted current through workpiece must be stopped at the proper time to preclude overheating of the soldered joint parts whereby the disc could be burned, solder could be heated above proper soldering temperature or other damaging effects of excess temperature could occur.

Interruption of soldering current is effected by stop solder timer $E^1$ of circuit E which is energized simultaneously with the other two circuits by limit switch 15 as hereinbefore explained Circuit E activates clutch $C^2$ which instantaneously magnetically closes contacts 43 thus supplying current to timer motor $M^2$ controlling movement of movable contact 44. Motor control of movable contact 44 is so set that at a prescribed time after start solder timer $D^1$ has closed circuit F as hereinbefore explained, timer motor $M^2$ of stop solder timer $E^1$ will move movable contact 44 from normal closed circuit position as shown to open circuit position, thus terminating flow of resistance welding current to soldering electrodes 2 and 3 and thence through disc 16 and workpiece 18. Aforementioned cycle timer $B^1$ has maintained circuits B throughout subsequent steps described. Timer motor M, shortly after conclusion of start and stop solder timers $D^1$ and $E^1$ have performed functions described, moves its own timer contacts (not shown) to a position of open circuit for circuits B whereby solenoid 14 and clutch C are deenergized, solenoid core 14a reverts to original position transmitting motion through arm 21, connecting link 22 to air valve lever 23 whereby air from supply is shut off and the air supporting cylinder piston is directed to valve exhaust port allowing weight of workpiece 18 in lift 10 to exhaust the air from the cylinder 12 through action of its gravitational force with resultant lowering of workpiece 18 and lift 10 to position for removal and replacement with another workpiece. Limit switch 15 reverts to open position upon interruption of circuits B by cycle timer $B^1$ and all timers revert to normal position at conclusion of the cycle thus preparing the machine for identical repeat cycle for every workpiece as presented.

While we have shown and described one specific embodiment of our invention, it will be understood that this embodiment is merely for the purpose of illustration and description and that various other forms may be devised within the scope of our invention, as defined in the appended claims.

We claim:

1. A machine for soldering thin metallic discs around an aperture in a flange disposed interiorly of a cylindrical body member, said body member having an inwardly tapering upper end, comprising a vertically reciprocable platform constructed and arranged to receive the lower end of the said cylindrical body member, a downwardly spring-biased combined guide and electrode disposed above said platform, said combined guide and electrode having an opening therethrough of the same shape as the tapered upper end of said body member whereby said electrode yieldingly engages the upper end of a body member disposed on said platform and positions it when said platform is lifted.

2. A machine for soldering thin metallic discs around an aperture in a flange disposed interiorly of a cylindrical body member, said member having an inwardly tapering upper end, a vertically reciprocable platform constructed and arranged to receive the end of a vertically disposed body member, two downwardly spring-biased electrodes disposed above said platform, one of said electrodes comprising a highly conductive member having a loose pivotal mounting adapted to engage said thin metallic disc around the entire perimeter thereof, the other of said electrodes comprising a member having an opening therethrough of the same shape as the tapered upper end of said body member whereby said member yieldingly engages the upper end of a body member disposed on said platform and positions it concentrically of said first-mentioned electrode when said platform is lifted.

RAYMOND R. KUBIC.
CARL H. NYLANDER.

REFERENCES CITED

The following references are of record in the file of this patent:

UNITED STATES PATENTS

| Number | Name | Date |
| --- | --- | --- |
| Re. 22,364 | Stansbury | Aug. 10, 1943 |
| 496,019 | Thomson | Apr. 25, 1893 |
| 1,153,384 | Heany | Sept. 14, 1915 |
| 2,159,860 | Platz | May 23, 1939 |
| 2,189,595 | Smith | Feb. 6, 1940 |
| 2,231,695 | Vedder | Feb. 11, 1941 |
| 2,302,748 | Du Roza et al. | Nov. 24, 1942 |
| 2,323,696 | Weightman | July 6, 1943 |
| 2,330,658 | Albright | Sept. 28, 1943 |
| 2,343,998 | Powell | Mar. 14, 1944 |